June 26, 1956
C. R. BONNELL
2,752,466
ACCELEROMETER
Filed Aug. 11, 1954
2 Sheets-Sheet 1
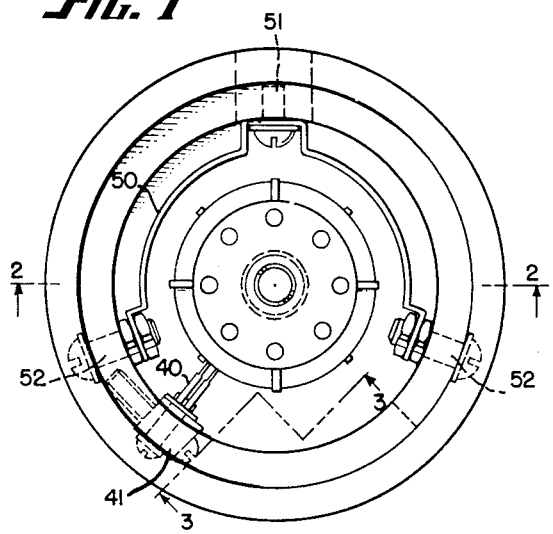
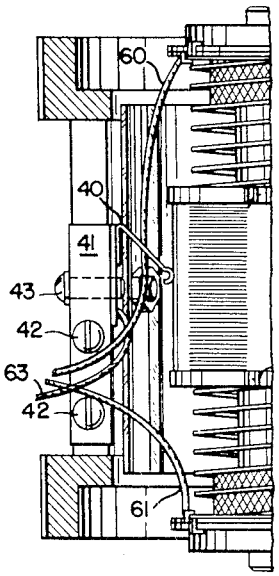
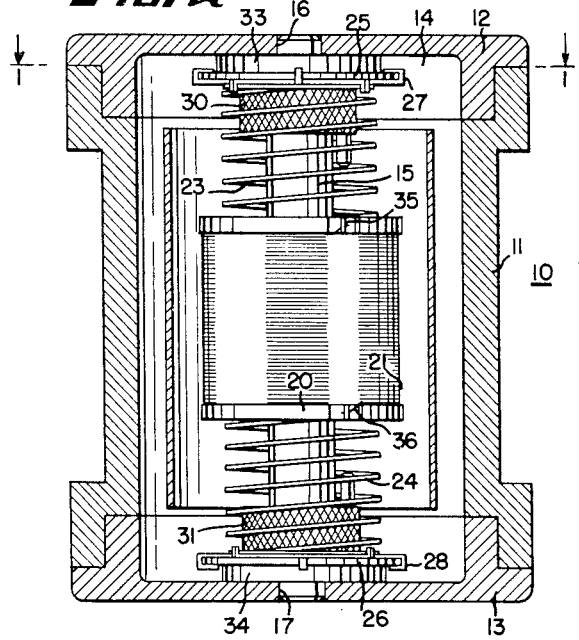
INVENTOR
CHARLES R. BONNELL
BY *George H. Fisher*
ATTORNEY June 26, 1956 C. R. BONNELL 2,752,466
ACCELEROMETER
Filed Aug. 11, 1954 2 Sheets-Sheet 2
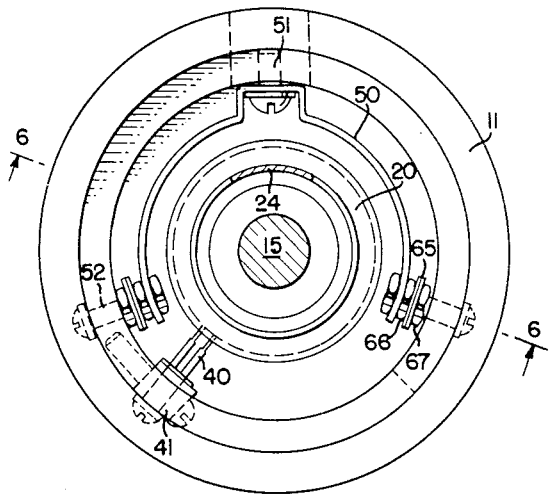
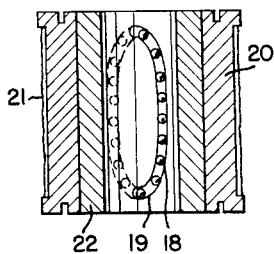
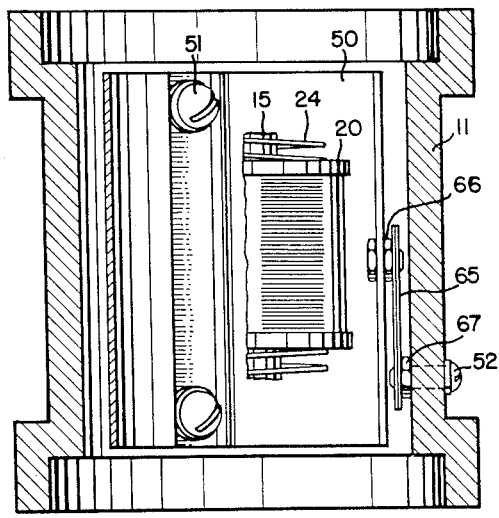
INVENTOR
CHARLES R. BONNELL
BY George H. Fisher
ATTORNEY

United States Patent Office 2,752,466
Patented June 26, 1956

2,752,466
ACCELEROMETER

Charles R. Bonnell, Columbia Heights, Minn., assignor to Minneapolis-Honeywell Regulator Company, Minneapolis, Minn., a corporation of Delaware Application August 11, 1954, Serial No. 449,035

7 Claims. (Cl. 201—48)

My invention relates to acceleration sensing apparatus and more particularly to an improved accelerometer design.

While acceleration sensing or accelerometer devices are broadly old and well known in the art, they have generally been either insensitive and inaccurate in operation because of construction which fails to isolate and prohibit the effect of extraneous forces or they have been so complex in design that they are unable to withstand the normal shock and vibration experienced in operation on modern day aircraft. My invention relates to an improved accelerometer design which is simple in construction, economical to manufacture, and yet eliminates substantially all the effects of friction and extraneous forces applied thereto while still presenting a rugged device capable of withstanding normal handling and operational shocks and vibrations.

It is therefore an object of this invention to provide an improved accelerometer design which is simple in design and economical to manufacture and maintain.

It is also an object of this invention to provide in an accelerometer design a novel arrangement of parts which isolates and prevents extraneous accelerations from affecting the sensitivity of the apparatus.

It is further an object of this invention to provide in an accelerometer design a novel damping arrangement.

Another object of this invention is to provide an improved damped accelerometer with temperature compensation.

These and other objects of this invention will become apparent from a reading of the attached description together with the drawings wherein:

Figure 1 is a plan view of the accelerometer with an end cap of the casing removed, Figure 2 is a sectional view of the accelerometer taken along the line 2—2 of Figure 1, Figure 3 is a sectional view of a portion of the accelerometer taken along the line 3—3 of Figure 1, Figure 4 is a sectional view of the bearing for the accelerometer, and Figures 5 and 6 are plan and side sectional views of a modification of my improved accelerometer.

My improved accelerometer design will best be seen in Figures 2 and 3 as comprising a casing indicated generally at 10 having a central portion 11 and a pair of end caps 12 and 13 press fitted to the central portion to make a cylindrical housing with an aperture 14 therein. Centrally located within the aperture 14 is a shaft 15 positioned in apertures 16 and 17 in end caps 12 and 13 respectively.

Mounted on shaft 15 is a bobbin 20 having a winding 21 wound thereon. Bobbin 20 is mounted on a shaft through suitable bearing means 22 positioned between the inner periphery of the bobbin and surrounds the shaft, the bearing means having ball type bearings 18 mounted in a continuous track 19 which is partially exposed to the shaft so that the balls engage the shaft to move in their track and permit sliding movement of the bobbin along the extent of the shaft, as will be seen in Figure 4. Encircling the shaft 15 and engaging the bobbin 20 at either extremity thereof are a pair of springs 23, 24 respectively. Springs 23 and 24 are supported near the extremities of the shaft 15 on insulating plates or brackets 25, 26 respectively which include conducting brackets 27, 28 which connect the ends of the springs to the respective brackets for purposes to be later noted. Springs 23 and 24 are also soldered to these brackets for mechanical support and good electrical conductivity. The brackets 25 and 26 are loosely positioned on shaft 15 and a pair of adjusting and stop members 30, 31 are also positioned on shaft 15 adjacent brackets 25, 26, those members being mounted on the shaft 15 through suitable screw type connections (not shown). The adjusting members 30, 31 are adapted to be moved relative to the shaft and engage the plates 25, 26 respectively to move the same longitudinally along the shaft to compress or expand the springs 23, 24 respectively positioning the bobbin with the winding thereon with respect to the shaft. Also secured to the shaft through suitable means, not shown, are lock nuts 33, 34 respectively which when tightened prevent the rotation of the adjusting members 30, 31 after the position of the bobbin has been set.

In addition to biasing the bobbin to a neutral position and presenting restraint of the bobbin which acts as the mass of the accelerometer against the acceleration forces, the springs 23 and 24 are also connected to the extremities of the winding 21 on the bobbin as indicated at 35 and 36 respectively, and the springs are connected at their opposite extremities to the adjusting plates 25 and 26 through the clamping members 27 and 28 to provide for electrical connection at these points. The springs therefore serve as flexible conductors for the winding 21 in bringing power into the same. As seen in Figure 3 lead wires 60, 61 are attached to the winding plates 27 and 28 and as will be later noted are connected through a passageway in the central portion 11 of the casing to be connected to a suitable source of power.

Cooperating with the winding 21 on the bobbin 20 is a wiper 40 as shown in Figures 1 and 3 which is mounted on an insulating block 41 in the wall of the central portion 11 of the casing, the block being secured to the casing through suitable screw means 42 and the wiper being secured to the block through suitable screw means 43. The wiper is so positioned with respect to the casing that it engages the surface of the winding in electrical contact therewith. Thus it will be seen that as acceleration forces are impressed on the biased mass of the accelerometer, that is the winding and bobbin, the bobbin and winding will move relative to the wiper to vary the position of the wiper on the winding and hence vary the output of the signal potentiometer produced by the combination of the winding and wiper. Also attached to the inner side of the central portion 11 of casing 10 is a baffle plate semicylindrical in form and indicated at 50 which baffle plate is secured through screw means 51 at its central portion and at its extremities through screw means 52 to partially encircle the shaft and the bobbin with the winding thereon being spaced substantially uniformly from the sides of the surfaces of the bobbin throughout its extent.

Although not shown in the drawing, the casing 10 is adapted to be enclosed in an outer sealed container having an external connector positioned in the end wall thereof. The casing 10 is filled with the damping fluid which completely fills the aperture 14 and surrounds the bobbin, damping plate and shaft 15. Movement of the bobbin 20 relative to the shaft and hence the damping plate 50 provides for damping action with the viscous shear action of the fluid between the plate 50 and bobbin 20. It will be seen that the accelerometer mass which is the bobbin 20 and winding 21 thereon is mounted for movement along the shaft in response to acceleration impressed on the device in this direction and will so move in cooperation with the wiper 40 to provide a signal output from the device in proportion to the acceleration force. Movement of the mass is damped to eliminate all extraneous oscillation in this direction. It will also be evident that the particular mounting of the mass on the shaft is such as to eliminate movement between the wiper and winding or the parts of the signal generator in response to forces in other directions than that applied along the shaft.

The electrical connections from the extremities of the springs 23 and 24 which are connected to lead wires 60 and 61 are shown as passing through an opening in the side wall or central portion 11 of the casing member 10 adjacent the insulated block 41 and a similar connection 63 is utilized for connecting the wiper 40 to an external circuit. It will be understood, although not shown, that these lead wires lead into the outer casing and through suitable connecting means in the wall thereof.

The embodiment shown in Figures 5 and 6 is substantially the same as that shown in Figures 1–4 with the exception that it includes provision for temperature compensation on the operation of the accelerometer. For this reason most of the details of the device have been omitted in connection with Figures 5 and 6 for simplicity, but it will be understood that they are to be included in the device as modified.

As shown in Figures 5 and 6 the modification is concerned with the damping plate 50 which is secured to the inner portion 11 of casing 10 by screws 51. The outer extremities of the damping plate which partially encircles the bobbin 20 and shaft 15 are attached to the inner portion 11 of the casing through bimetal elements 65 which are attached to the plate through suitable means such as screws 66 at one extremity and to the casing by screws 67. The bimetal elements are identical in structure and wide ambient temperature variations deflect the extremities and hence a major portion of the plate 50 toward and away from the bobbin 20 to vary the spacing therebetween. This will compensate for the change in viscosity of the damping fluid to produce a constant damping action with temperature variations.

In considering this invention it should be kept in mind that while our present disclosure relates to a particular configuration of the signal generator with the winding mounted on the movable element of the accelerometer that an interchange of parts may be made within the scope of the invention or other types of signal generating equipment may be utilized wherein one part of the same is mounted on a movable mass so arranged and constructed. Therefore in considering the invention I wish to be limited only by the appended claims.

I claim as my invention:

1. An acceleration sensing device comprising, a shaft, a signal potentiometer including a winding and a wiper, bearing means mounting said winding on said shaft such that said winding is free to move along said shaft and substantially prevent it from translational or rotational movement with respect to said shaft, a casing mounting said shaft and encircling said shaft and said potentiometer with the wiper of said potentiometer mounted on the inner periphery of said casing and in cooperating relationship with said winding, biasing means positioned between said winding and said casing and positioning said winding in a neutral position on said shaft, means insulating said winding from said shaft and constituting with said winding a mass movable longitudinally along said shaft in response to normal accelerational forces applied to said casing, a damping plate attached to said casing and positioned within said casing partially encircling said shaft and said windings, a damping fluid filling said casing and cooperating with said damping plate to dampen movement of said winding along said shaft, and electrical connection means connecting said winding to said casing.

2. An acceleration sensing device comprising, a shaft, a signal potentiometer including a winding and cooperating wiper, bobbin means mounting said winding, bearing means mounting said bobbin on said shaft for sliding movement along the same, a casing mounting said shaft and encircling the same, means mounting the wiper of said signal potentiometer within said casing and on the inner wall thereof in cooperating relationship with the winding of said signal potentiometer, a pair of springs encircling said shaft at either extremity of said bobbin and engaging said casing for positioning said bobbin on said shaft in a neutral position, the bobbin and winding thereon constituting a mass movable longitudinally along the shaft in response to normal acceleration forces applied to said casing, and means including a damping fluid filling said casing and cooperating with said bobbin to dampen movement thereof.

3. An acceleration sensing device comprising, a shaft, a signal potentiometer including a winding and cooperating wiper, bobbin means mounting said winding, bearing means mounting said bobbin on said shaft for sliding movement along the same, a casing mounting said shaft and encircling the same, means mounting the wiper of said signal potentiometer within said casing and on the inner wall thereof in cooperating relationship with the winding of said signal potentiometer, a pair of springs encircling said shaft and positioned at either extremity of said bobbin, spring adjusting means attached to said casing and engaging said springs remote from said bobbin for adjustably positioning said springs and said bobbin on said shaft in a neutral position, said bobbin with said winding thereon constituting a mass movable longitudinally along said shaft against the bias of said springs and in response to normal acceleration forces applied to said casing, means including a damping fluid included in said casing and cooperating with said bobbin to dampen movement of the same, and electrical connections between said winding and said casing.

4. An acceleration sensing device comprising, a shaft, a signal potentiometer including a winding and cooperating wiper, bobbin means mounting said winding, bearing means mounting said bobbin on said shaft for sliding movement along the same, a casing mounting said shaft and encircling the same, means mounting the wiper of said signal potentiometer within said casing and on the inner wall thereof in cooperating relationship with the winding of said signal potentiometer, a pair of springs encircling said shaft and positioned at either extremity of said bobbin, spring adjusting means attached to said casing and engaging said springs remote from said bobbin for adjustably positioning said springs and said bobbin on said shaft in a neutral position, said bobbin with said winding thereon constituting a mass movable longitudinally along said shaft against the bias of said springs and in response to normal acceleration forces applied to said casing, a semicylindrical damping plate attached to the inner periphery of said casing and partially encircling said shaft and said winding, a damping fluid filling said casing and cooperating with said damping plate to dampen movement of said bobbin, and electrical connections between said winding and said casing.

5. An acceleration sensing device comprising, a shaft, a signal potentiometer including a winding and a wiper, bearing means mounting said winding on said shaft such that said winding is free to move along said shaft and substantially prevent it from translational or rotational movement with respect to said shaft, a casing mounting said shaft and encircling said shaft and said potentiometer with the wiper of said potentiometer mounted on the inner periphery of said casing and in cooperating relationship with said winding, spring biasing means positioned between said winding and said casing and positioning said winding in a neutral position on said shaft, adjustable means positioned on said casing adjacent said spring biasing means at either extremity of said shaft for adjusting the position of said winding on said shaft, means insulating said winding from said shaft and constituting with said winding a mass movable longitudinally along said shaft in response to normal accelerational forces applied to said casing, a damping plate attached to said casing and positioned within said casing partially encircling said shaft and said winding, temperature compensating means connected to said damping plate and said casing and adjusting the position of said plate relative to said casing and said winding and a damping fluid positioned in said casing.

6. An acceleration sensing device comprising, a shaft, a signal generator including a pair of relatively movable parts, bearing means mounting one of said parts of said signal generator on said shaft such that said part is free to move along said shaft and substantially prevented from translational and rotational movement with respect to said shaft, a casing means for said accelerometer including a central portion and a pair of end caps which when assembled encircle said shaft and said generator, means mounting said shaft to said end caps of said casing and the other part of said signal generator to the inner wall of said central portion of said casing in cooperating relationship with said first part of said generator, biasing means positioned between said first part of said generator and said end caps and encircling said shaft to position said first part of said signal generator along said shaft in a neutral position, said first part of said generator constituting a mass movable longitudinally along said shaft in response to acceleration forces supplied to said casing, a damping plate attached at its midpoint to said central portion of said casing and positioned within said casing partially encircling said shaft and said part of said generator, a pair of bimetal elements connected between the extremities of said damping plate and said casing, and a damping fluid filling said casing and cooperating with said plate to dampen movement of said first part of said generator.

7. An acceleration sensing device comprising, a shaft, a signal potentiometer including a winding and a wiper, bearing means mounting said winding on said shaft such that said winding is free to move along said shaft and substantially prevent it from translational or rotational movement with respect to said shaft, a casing mounting said shaft and encircling said shaft and said potentiometer with the wiper of said potentiometer mounted on the inner periphery of said casing and in cooperating relationship with said winding, spring biasing means positioned between said winding and said casing and positioning said winding in a neutral position on said shaft, adjustable means positioned on said casing adjacent said spring biasing means at either extremity of said shaft for adjusting the position of said winding on said shaft, means insulating said winding from said shaft and constituting with said winding a mass movable longitudinally along said shaft in response to normal accelerational forces applied to said casing, a semicylindrical damping plate positioned on the inner periphery of said casing being slightly spaced therefrom along a portion of its extent and partially encircling said shaft and said winding, temperature compensating means connected to said plate and said casing for varying the position of said plate relative to said casing and said winding with temperature variation, and a damping fluid in said casing.

References Cited in the file of this patent

UNITED STATES PATENTS

| 2,332,994 | Draper et al. | Oct. 26, 1943 |
| 2,498,118 | Weiss | Feb. 21, 1950 |
| 2,569,311 | Hoare et al. | Sept. 25, 1951 |

FOREIGN PATENTS

| 672,042 | France | Sept. 14, 1929 |